United States Patent
Liu et al.

(10) Patent No.: US 10,564,438 B2
(45) Date of Patent: Feb. 18, 2020

(54) SLIT GRATING, AND THREE-DIMENSIONAL DISPLAY APPARATUS HAVING SLIT GRATING

(71) Applicant: BOE TECHNOLOGY GROUP CO., LTD., Beijing (CN)

(72) Inventors: Xingdong Liu, Beijing (CN); Guobing Yin, Beijing (CN); Min Peng, Beijing (CN); Jiyang Shao, Beijing (CN); Ke Chao, Beijing (CN); Yuting Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 104 days.

(21) Appl. No.: 15/744,441

(22) PCT Filed: Jun. 22, 2017

(86) PCT No.: PCT/CN2017/089527
§ 371 (c)(1),
(2) Date: Jan. 12, 2018

(87) PCT Pub. No.: WO2018/054110
PCT Pub. Date: Mar. 29, 2018

(65) Prior Publication Data
US 2018/0373052 A1 Dec. 27, 2018

(30) Foreign Application Priority Data
Sep. 26, 2016 (CN) .......................... 2016 1 0851836

(51) Int. Cl.
*G02B 27/22* (2018.01)

(52) U.S. Cl.
CPC .............................. *G02B 27/2214* (2013.01)

(58) Field of Classification Search
CPC .................................................. G02B 27/2214
See application file for complete search history.

(56) References Cited

U.S. PATENT DOCUMENTS

2010/0026920 A1    2/2010   Kim et al.

FOREIGN PATENT DOCUMENTS

| CN | 102109706 A | 6/2011 |
| CN | 104460014 A | 3/2015 |
| CN | 105404067 A | 3/2016 |
| CN | 105911710 A | 8/2016 |

(Continued)

OTHER PUBLICATIONS

Zhang, "Stereoscopic display and grating thereof", CN102109706, machine translation.*

(Continued)

*Primary Examiner* — Wen Huang
(74) *Attorney, Agent, or Firm* — Westerman, Hattori, Daniels & Adrian, LLP (57) ABSTRACT

A slit grating and a three-dimensional (3D) display apparatus including the slit grating are disclosed herein, the slit grating includes a plurality of grating structures (11-17) arranged side by side. The widths of the grating structures (11-17) increase and then decrease, along the direction in which the grating structures (11-17) are arranged. A grating structure (13,14) having the largest width may define a trend change point after which the trend in the widths of the grating structure widths changes.

10 Claims, 10 Drawing Sheets

(56) References Cited

FOREIGN PATENT DOCUMENTS

| CN | 105911711 A | 8/2016 |
|----|-------------|--------|
| JP | 2014-006950 A | 1/2014 |
| WO | 2013/142120 A1 | 9/2013 |
| WO | 2014/108670 A1 | 7/2014 |

OTHER PUBLICATIONS

International Search Report dated Sep. 27, 2017, issued in counterpart International Application No. PCT/CN2017/089527 (14 pages).
Office Action dated Feb. 26, 2019, issued in counterpart CN Application No. 201610851836.1, with English translation. (40 pages).

* cited by examiner

SLIT GRATING, AND THREE-DIMENSIONAL DISPLAY APPARATUS HAVING SLIT GRATING

CROSS-REFERENCE TO RELATED APPLICATIONS

This application claims the benefit of the filing date of Chinese Patent Application No. 201610851836.1 filed on Sep. 26, 2016, the entire disclosure of which is hereby incorporated by reference.

TECHNICAL FIELD

The present disclosure relates generally to display technologies, and more particularly, to a slit grating and a stereoscopic display apparatus comprising the slit grating.

BACKGROUND

With the development of computer information technology and display technology, a stereoscopic three-dimensional (3D) display technology has become a focus of research in the display field. 3D displays allow myriad of special visual effects to be presented to viewers. 3D display technologies can reproduce completely 3D spatial information in a scene, so as to allow a viewer to see elements of the scene emerging from the screen, stretching into the depth of the screen, and/or suspending in the air.

Autostereoscopic 3D display technology refers to a display technique, in which a 3D effect can be observed without the assistance of special eyewear. Autostereoscopic 3D displays based on gratings may be among the most widely used. Its advantages include simple construction, easy implementation, and remarkable visual effects. Lens grating and slit grating are the two main grating techniques. A lens grating generally includes a transparent grating plate having a cylindrical array. A slit grating generally includes a transparent grating thin film having a slit array with alternating bright and dark domains. Among other advantages, the construction of slit grating is usually simpler, its production cost lower, its grating parameters easier to manipulate, and it is free of focus problems. As such, 3D displays often utilize slit grating.

BRIEF SUMMARY

One embodiment of the present disclosure is a slit grating. The slit grating may comprise a plurality of grating structures arranged side by side, each grating structure comprising a light-blocking domain and a light-transmitting domain. Along a direction in which the grating structures are arranged, widths of the grating structures may successively increase and then decrease.

In at least some embodiments, at least one of the grating structures forms a trend change point. The widths of the grating structures may successively decrease in an outward direction away from the trend change point.

In at least some embodiments, one of the plurality of grating structures having the largest width forms the trend change point.

In at least some embodiments, the slit grating may comprise an odd number of grating structures. One grating structure positioned at a midpoint of the slit grating may form the trend change point.

In at least some embodiments, the light-blocking domains and the light-transmitting domains of the plurality of grating structures may be arranged in an alternating manner.

In at least some embodiments, the slit grating may comprise an even number of grating structures. A pair of grating structures positioned at a midpoint of the slit grating may form the trend change point. The light-blocking domain of each of the pair of grating structures may abut the light-blocking domain of the other of the pair of grating structures. The light-transmitting domain of each of the pair of grating structures may abut a light-transmitting domain of a grating structure on a side of the grating structure opposite from the other of the pair of grating structures.

In at least some embodiments, the widths of the grating structures may successively decrease in a linear manner. The widths of the grating structures may successively decrease in equal increments. A linear coefficient by which the widths of the grating structures successively decrease may be at least 0.7 and less than 1. In at least some embodiments, the linear coefficient may be at least 0.99 and less than 1.

In at least some embodiments, the widths of the grating structures may successively decrease in a non-linear manner.

In at least some embodiments, a slit aperture ratio of each of the plurality of grating structures may be the same. The slit aperture ratio may be in a range of from 0.2 to 0.6.

Another embodiment of the present disclosure is a three-dimensional display apparatus. The display apparatus may comprise a slit grating as described above.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings, in which:

The drawings accompanying this disclosure are not drawn to scale, and are for illustrative purposes only. The dimensions and geometries shown in the drawings are not intended to limit the scope of this disclosure.

DETAILED DESCRIPTION

Next, the embodiments of the present disclosure will be described clearly and completely in conjunction with the accompanying drawings, which are described briefly above. The subject matter of the present disclosure is described with specificity to meet statutory requirements. However, the description itself is not intended to limit the scope of this disclosure. Rather, the inventors have contemplated that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiment for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Figure 1:
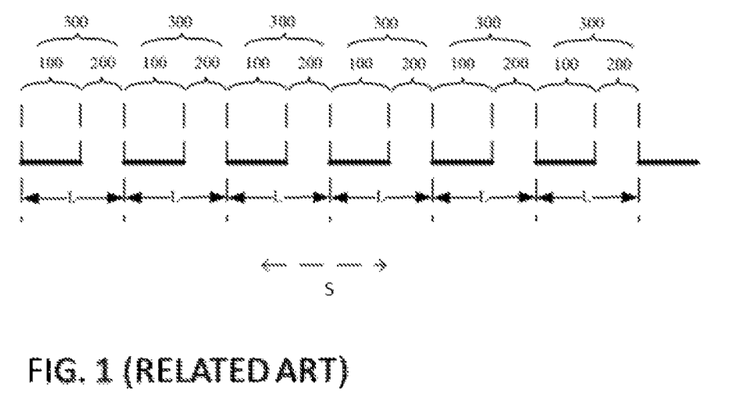
FIG. 1 shows a schematic diagram of the basic structure of a conventional slit grating.
Figure 2A:
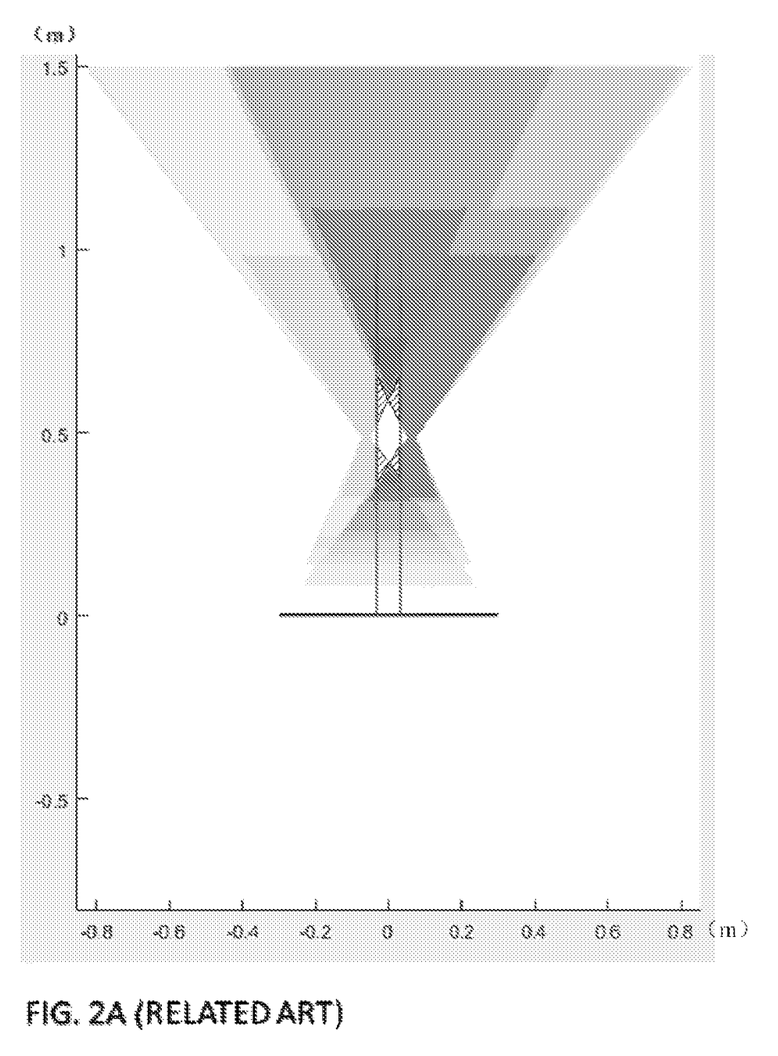
FIG. 2A shows simulated viewing zones produced by a 3D display apparatus using a conventional slit grating.
Figure 2B:
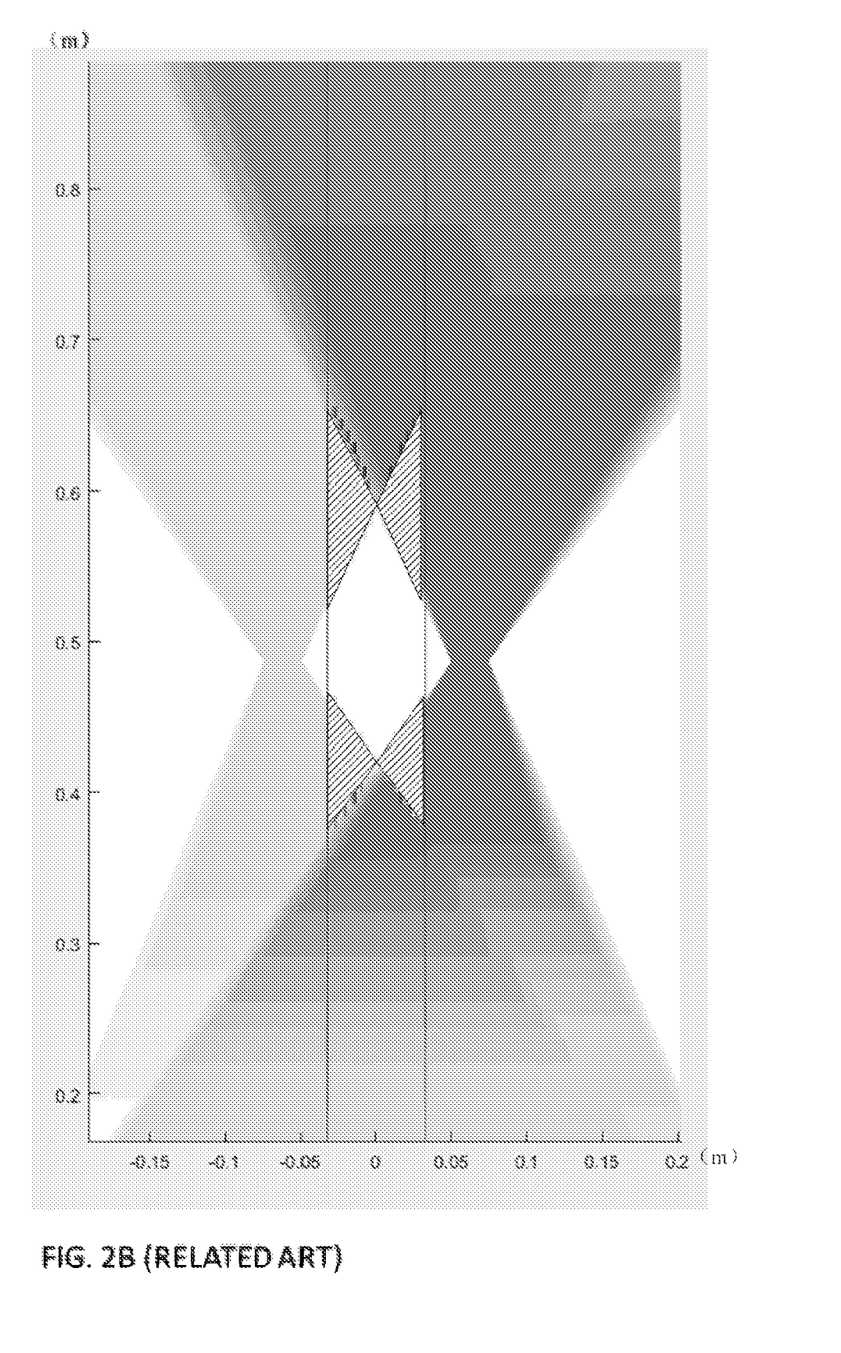
FIG. 2B is an enlarged view of FIG. 2A.

As shown in FIG. 1, a conventional slit grating contains alternating light-blocking domains 100 and light-emitting domains 200. Each pair of adjacent light-blocking domain 100 and light-emitting domain 200 constitutes a grating structure 300. FIG. 1 shows six (6) grating structures 300. The grating structures 300 have an identical width in the direction S in which the grating structures 300 are arranged (as indicated by the dotted arrow in FIG. 1). Specifically, the width of each grating structure 300 is equal to the length L of each slit period. When a slit grating thus configured is used in a 3D display apparatus, geometrical tracing of optical rays from the 3D display panel to normal viewing zones form diamond shapes. These viewing zones are sweet spots where artifacts reducing the quality of a viewer's experience, such as crosstalk, are minimal or even altogether absent. However, these viewing zones have a short length in the direction perpendicular to the plane of the display panel, so that the areas of the viewing zones are limited. Since the viewer's viewing areas or ranges are limited by the specific viewing zones, as soon as the viewer moves outside the sweet spots, the viewer would perceive significant impairments in the visual quality of the 3D displays. Small viewing zones can therefore significantly curtail the viewing freedom of a viewer. FIGS. 2A and 2B illustrate the simulated viewing zones produced by a conventional slit grating in a 3D display apparatus. FIG. 2B is an enlarged view of FIG. 2A. In FIGS. 2A and 2B, areas shaded by diagonal lines correspond to viewing areas with minimal or no crosstalk. The x-axis represents horizontal distance in the direction parallel to the plane of the display panel, and the y-axis represents the distance from the display panel to the slit grating (i.e., distance in the direction perpendicular to the plane of the display panel).

In view of the foregoing, there exists a need for technological improvements to the conventional slit grating, including the need to enlarge the viewing zones when a slit grating is used in a 3D display apparatus.

Figure 3A:
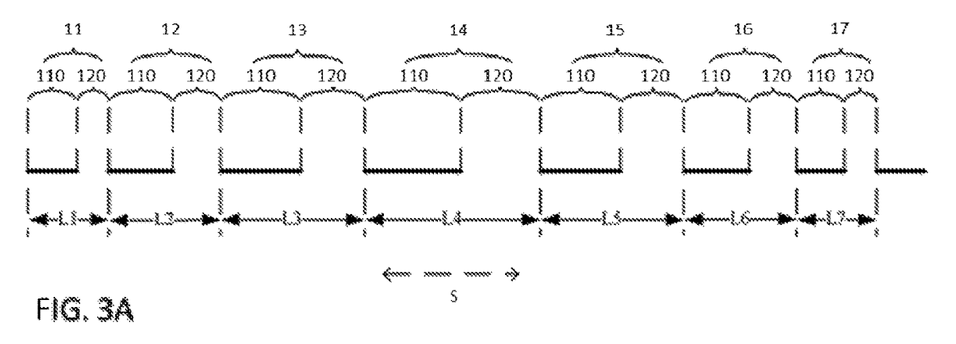
FIGS. 3A to 3E show schematic diagrams of a slit grating according to embodiments of the present disclosure.

FIGS. 3A to 3E show schematic diagrams of a slit grating according to embodiments of the present disclosure. The slit grating comprises a plurality of grating structures 11, 12, 13, 14, 15, 16, 17. Each grating structure 11, 12, 13, 14, 15, 16, 17 comprises a light-blocking domain 110 and a light-transmitting domain 120. In the slit grating, the grating structures 11, 12, 13, 14, 15, 16, 17 are arranged side by side, for example, in the direction S indicated by the dotted arrows. Along the direction S in which the grating structures 11, 12, 13, 14, 15, 16, 17 are arranged, the widths of the grating structures 11, 12, 13, 14, 15, 16, 17 first increase, and then decrease. For example, as illustrated in FIG. 3A, starting at the leftmost grating structure 11 and moving toward the right, the widths of the grating structures first increase (L1<L2<L3<L4), and then decrease (L4>L5>L6>L7). The grating structure having the largest width (for example, grating structure 14 having a width of L4 in FIG. 3A) forms the trend change point after which the trend in the grating structure widths changes (for example, changing from a treand of increasing width to a trend of decreasing width in FIG. 3A). The trend change point may be any grating structure in the slit grating other than the grating structures located at the two ends (for example, grating structures 11 and 17 in FIG. 3A) of the slit grating. Further, the trend change point may be formed by a single grating structure or by a pair of adjacent grating structures. For example, in FIGS. 3A and 3B, a single grating structure 14 having a width of L4 forms the trend change point, whereas in FIGS. 3C and 3D, two adjacent grating structures 13, 14 having the widths L3 and L4, respectively, collectively form the trend change point.

When used in a 3D display apparatus, a slit grating according to the present disclosure makes it possible to extend the viewing zones in a direction perpendicular to a plane of the 3D display panel. As compared to a conventional slit grating, an advantage of a slit grating according to the present disclosure is to enable the extension of the viewing range within which a viewer can view the 3D display effects on a 3D display panel without interference from crosstalk. A slit grating according to the present disclosure can allow a viewer greater viewing freedom in adjusting their viewing positions (for example, distance and/or angle) relative to the display panel without risking visual impairments to the 3D effects being viewed. The slit grating according to the present disclosure can therefore significantly improve the quality of a viewer's 3D viewing experience.

There are no particular limitations on the type of the slit grating, and the slit grating may include any suitable type of slit grating known to a person of ordinary skill in the art. As an example, the slit grating may be formed of a plurality of stripe-shaped grating strips arranged at intervals. As another example, the slit grating may be a liquid crystal slit grating, in which the deflection of liquid crystal molecules when energized turns a device into a slit grating. As another example, the slit grating may be an electrochromic slit grating, in which energized electrochromic compounds switch between a colored state and a colorless state based on the principle of electron transfer (deoxidization or oxidization), to turn a device into a slit grating.

A slit grating according to the present disclosure may comprise an odd number or an even number of grating structures. There are no particular limitations on the specific number of grating structures.

In at least some embodiments, a slit grating may comprise an odd number of grating structures. A single grating structure having the largest width may form the trend change point. The grating structure forming the trend change point may be located at a midpoint of the slit grating. However, the designation of the trend change point is not particularly limited. For example, the trend change point may be defined by any one or more of the grating structures in the slit grating other than the grating structures located at the two ends. The trend change point is not necessarily formed by the grating structure located at the midpoint of the slit grating.

In at least some embodiments, a slit grating may comprise an even number of grating structures. The two grating structures having the largest widths may form the trend change point. The trend change point may be formed by the two grating structures located at the midpoint of the slit grating. However, here also, the designation of the trend change point is not particularly limited. For example, the trend change point may be defined by any one or more of the grating structures in the slit grating other than the grating structures located at the two ends of the slit grating. The trend change point is not necessarily formed by the grating structure located at the midpoint of the slit grating.

Two specific embodiments of slit grating according to the present disclosure will be discussed below, but it should be recognized that the present disclosure is not limited to these specific embodiments. The slit grating comprises an odd number of grating structures in one of the two specific embodiments, and an even number of grating structures in the other.

Figure 3B:
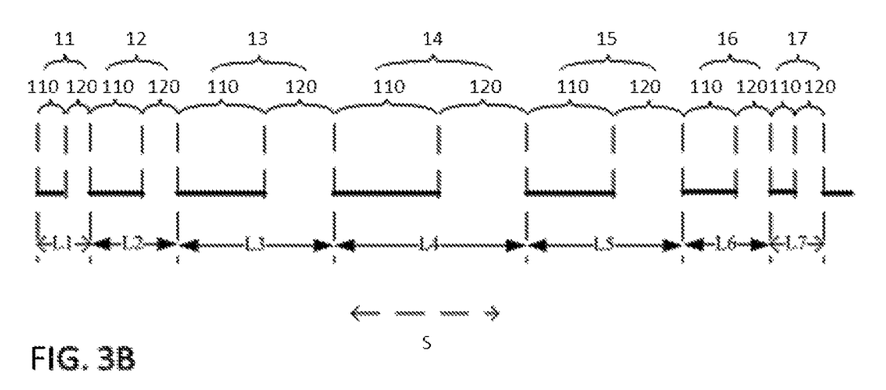

A slit grating according to the present disclosure may comprise an odd number of grating structures. For example, as shown in FIGS. 3A and 3B, the slit grating comprises seven (7) grating structures 11, 12, 13, 14, 15, 16, 17. Each grating structure 11, 12, 13, 14, 15, 16, 17 comprises a light-blocking domain 110 and a light-transmitting domain 120. The slit grating comprises an alternating arrangement of light-blocking domains 110 and light-transmitting domains 120. The light-blocking domains 110 of adjacent grating structures do not abut each other, and the light-transmitting domains 120 of adjacent grating structures also do not abut each other.

The dotted arrows in FIGS. 3A and 3B indicate the direction S in which the grating structures 11, 12, 13, 14, 15, 16, 17 are arranged. The widths of the grating structures 11, 12, 13, 14, 15, 16, 17 in the direction S in which they are arranged are L1, L2, L3, L4, L5, L6, and L7, respectively. The grating structure 14 having a width of L4, and which is shown in FIGS. 3A and 3B as being located at the midpoint of the slit grating, forms the trend change point. The widths of grating structures 11, 12, 13, 15, 16, 17 on either side of the trend change point decrease incrementally toward each end of the slit grating. For example, as illustrated in FIGS. 3A and 3B, the widths of the grating structures 11, 12, 13, 14, 15, 16, 17 satisfy the following relationship: $L1<L2<L3<L4>L5>L6>L7$.

Figure 4A:
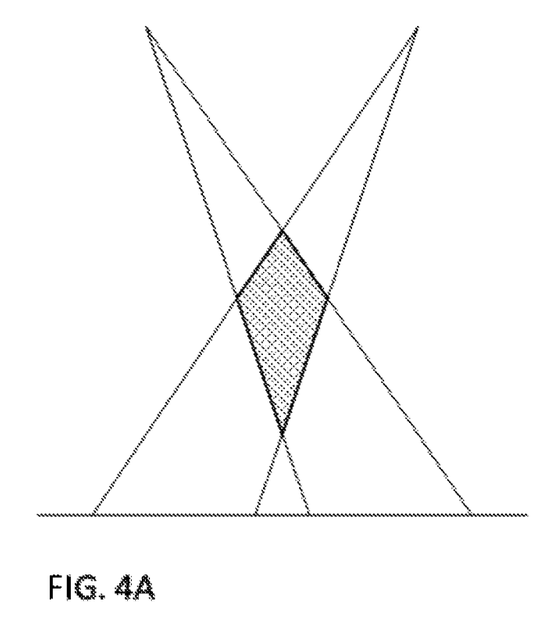
FIGS. 4A and 4B are schematic diagrams showing viewing zones produced by a 3D display apparatus using a slit grating according to the present disclosure.

In at least some embodiments, the widths of grating structures on either side of the trend change point may decrease in a linear fashion. For example, as shown in FIG. 3A, starting at the leftmost grating structure 11 and moving toward the right, and the grating structure 14 having a width of L4 forming the trend change point, the grating structure widths L1, L2, L3, and L4 may satisfy the following relationship: $L3=a \times L4$, $L2=a \times L3$, and $L1=a \times L2$, wherein $0<a<1$. Meanwhile, the grating structure widths L4, L5, L6, and L7 may satisfy the following relationship: $L5=b \times L4$, $L6=b \times L5$, and $L7=b \times L6$, wherein $0<b<1$. In the above, a and b are linear coefficients by which the widths of the grating structures successively decrease. Optionally, the widths of grating structures on either side of the trend change point decrease in equal increments. For example, as shown in FIG. 3A, the value of a is equal to the value of b. When a slit grating configured in the manner shown in FIG. 3A is used in a 3D display apparatus, geometrical tracing of optical rays from the 3D display panel to normal viewing zones form diamond shapes, for example, as shown in FIG. 4A.

Optionally, the value of a or b is at least 0.7, and less than 1, and optionally, at least 0.99 and less than 1. This can extend the length of the viewing zones by a larger margin in the direction perpendicular to the plane of the display panel. When the increment of change in the grating structure width is within the above-described range, the resulting slit grating can generate larger and more flexible viewing ranges. A viewer can in turn have greater freedom in adjusting their viewing positions (for example, distance and/or angle) relative to the 3D display panel without perceiving visual impairments to the 3D displays. However, the value of a or b are not particularly limited, and can be adjusted according to specific design requirements and/or practical considerations (for example, dimensions of the 3D display panel, shrinkage of the slit grating, and the like).

Figure 4B:
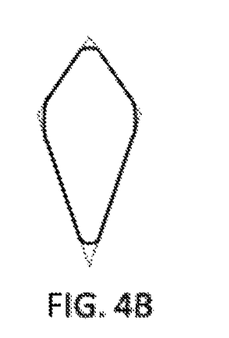

Embodiments where the grating structure widths decrease in a non-linear fashion are also possible. For example, as shown in FIG. 3B, the grating structure widths L1, L2, L3, and L4 may satisfy the following relationship: $L3=a \times L4$, $L2=a^2 \times L3$, and $L1=a^3 \times L2$, wherein $0<a<1$. Meanwhile, the grating structure widths L4, L5, L6, and L7 may satisfy the following relationship: $L5=b \times L4$, $L6=b^2 \times L5$, and $L7=b^3 \times L6$, wherein $0<b<1$. When a slit grating configured in the manner shown in FIG. 3B is used in a 3D display apparatus, geometrical tracing of optical rays from the 3D display panel to normal viewing zones does not form a true diamond shape, but rather, a substantially diamond shape with rounded vertices, for example, as shown in FIG. 4B. A comparison of the viewing zone geometries as shown in FIGS. 4A and 4B indicate that, decreasing the grating structure widths in a non-linear fashion may also decrease the length of the viewing zones in a direction perpendicular to the plane of the display panel.

Optionally, the slit aperture ratio of each grating structure is the same. "Slit aperture ratio" refers to the ratio of the area of the light-transmitting domain to the total area of the grating structure. Making the slit aperture ratios of the grating structures the same can elongate the viewing zones, and more particularly, by decreasing the width of the viewing zones in a direction parallel to the plane of the display panel, while increasing the length of the viewing zones in a direction perpendicular to the plane of the display panel. This can in turn further improve the view ranges of a 3D display apparatus. Optionally, the slit aperture ratio of a grating structure is within the range of from 0.2 to 0.6. However, the dimensions of the slit aperture ratio are nit particularly limited, and can be adjusted according to specific design requirements and/or practical considerations.

A slit grating according to the present disclosure may comprise an even number of grating structures. For example, as shown in FIGS. 3C to 3E, the slit grating comprises six (6) grating structures 11, 12, 13, 14, 15, 16.

Figure 3C:
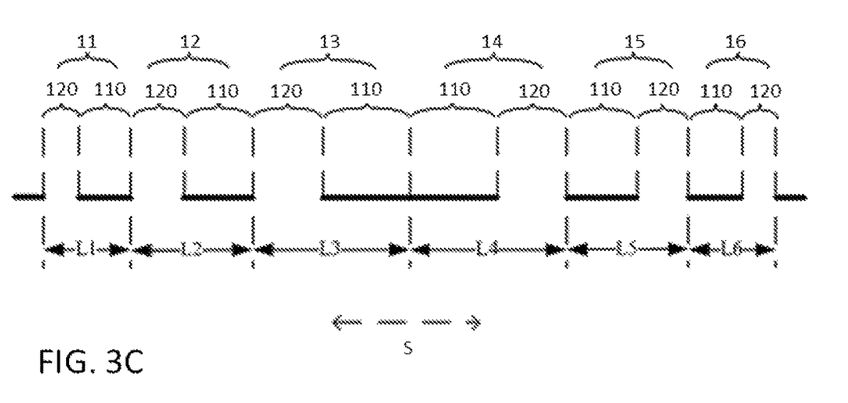
Figure 3D:
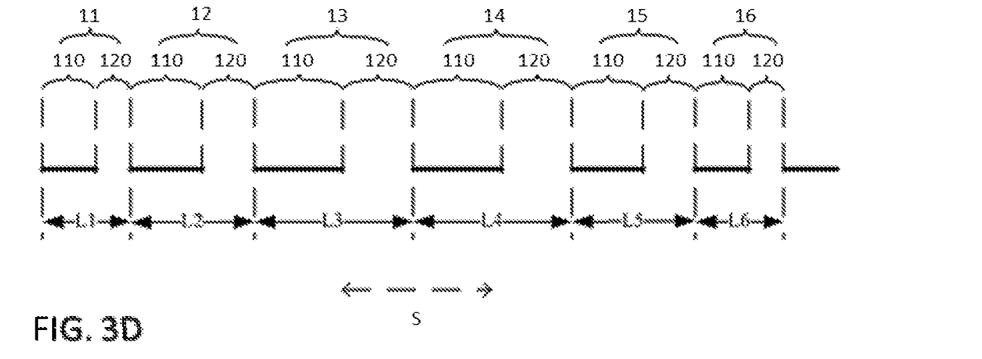
Figure 3E:
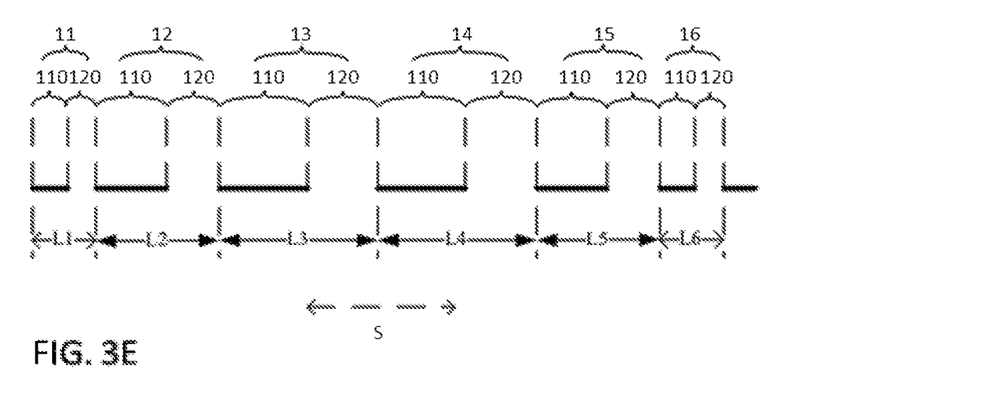

The dotted arrows in FIGS. 3C to 3E indicate the direction S in which the grating structures 1 are arranged. The widths of the grating structures 11, 12, 13, 14, 15, 16 in the direction S in which they are arranged are L1, L2, L3, L4, L5, and L6, respectively. The pair of grating structures 13, 14 having widths of L3 and L4, respectively, and which are shown in FIGS. 3C to 3E as being located at the midpoint of the slit grating, form the trend change point. The widths of grating structures 13, 14 forming the trend change point are equal, that is, $L3=L4$. The widths of grating structures 11, 12, 15, 16 on either side of the trend change point decrease incrementally toward each end of the slit grating. For example, as illustrated in FIGS. 3C to 3E, the widths of the grating structures 11, 12, 13, 14, 15, 16 satisfy the following relationship: $L1<L2<L3=L4>L5>L6$.

Each grating structure 11, 12, 13, 14, 15, 16 comprises a light-blocking domain 110 and a light-transmitting domain 120. The light-blocking domains 110 of adjacent grating structures 13, 14 forming the trend change point abut each other. The light-transmitting domain 120 of each of the grating structures 13, 14 forming the trend change point abuts the light-blocking domain 110 of the grating structure 12, 15 immediately adjacent to the trend change point, that is, on either side of the trend change point. For example, as shown in FIG. 3C, counting from the left, the light-blocking domain 110 of the third grating structure 13 abuts the light-blocking domain 110 of the fourth grating structure 14. The light-transmitting domain 120 of the third grating structure 13 abuts the light-blocking domain 110 of the second grating structure 12, and the light-transmitting domain 120 of the fourth grating structure 14 abuts the light-blocking domain 110 of the fifth grating structure 15.

However, the arrangements of the light-blocking domains 110 and light-transmitting domains 120 are not limited to the arrangement shown in FIG. 3C. Embodiments where the light-blocking domains 110 and the light-transmitting domains 120 of the grating structures 11, 12, 13, 14, 15, 16 are arranged in an alternating manner are also possible, for example, as shown in FIGS. 3D and 3E. In that case, the light-blocking domains 110 and the light-transmitting domains 120 of adjacent grating structures 11, 12, 13, 14, 15, 16 are not located adjacent to each other, and do not abut each other. Embodiments where each pair of adjacent grating structures is arranged in the same manner as the pair of grating structures forming the trend change point are also possible.

In at least some embodiments, the widths of grating structures on either side of the trend change point may decrease in a linear fashion. For example, as shown in FIG. 3D, starting at the leftmost grating structure 11 and moving toward the right, and with the grating structure 14 having a width of L4 forming the trend change point, the grating structure widths L1, L2, and L3 may satisfy the following relationship: $L2=a \times L3$, and $L1=a \times L2$, wherein $0<a<1$. Meanwhile, the grating structure widths L4, L5, and L6 may satisfy the following relationship: $L5=b \times L4$, $L6=b \times L5$, wherein $0<b<1$. In the above, a and b are linear coefficients by which the widths of the grating structures successively decrease. Optionally, the widths of grating structures on either side of the trend change point decrease in equal increments. For example, as shown in FIG. 3D, the value of a is equal to the value of b. When a slit grating configured in the manner shown in FIG. 3D is used in a 3D display apparatus, geometrical tracing of optical rays from the 3D display panel to normal viewing zones form diamond shapes, for example, as shown in FIG. 4A.

Optionally, the value of a or b is at least 0.7 and less than 1, and optionally, at least 0.99 and less than 1. This can extend the length of the viewing zones by a larger margin in the direction perpendicular to the plane of the display panel. When the increment of change in the grating structure width is within the above-described range, the resulting slit grating can impart a 3D display apparatus with larger and more flexible viewing ranges. A viewer can in turn have greater viewing freedom in adjusting their viewing positions (e.g., distance and/or angle) relative to the 3D display panel without perceiving visual impairments to the 3D displays being viewed. However, the value of a or b are not particularly limited, and can be adjusted according to specific design requirements and/or practical considerations (for example, dimensions of the 3D display panel, shrinkage of the slit grating, and the like).

Embodiments where the grating structure widths decrease in a non-linear fashion are also possible. For example, as shown in FIG. 3E, the grating structure widths L1, L2, and L3 satisfy the following relationship: $L2=a^2 \times L3$, and $L1=a^3 \times L2$, wherein $0<a<1$. Meanwhile, the grating structure widths L4, L5, and L6 satisfy the following relationship: $L5=b \times L4$, $L6=b^2 \times L5$, wherein $0<b<1$. When a slit grating configured in the manner shown in FIG. 3E is used in a 3D display apparatus, geometrical tracing of optical rays from the 3D display panel to normal viewing zones does not form a true diamond shape, but rather, a substantially diamond shape with rounded vertices, for example, as shown in FIG. 4B. A comparison of the viewing zone geometries as shown in FIGS. 4A and 4B indicate that, decreasing the grating structure widths in a non-linear fashion may also decrease the length of the viewing zones in a direction perpendicular to the plane of the display panel.

Optionally, the slit aperture ratio of each grating structure is the same. Optionally, the slit aperture ratio of a grating structure is within the range of from 0.2 to 0.6. However, the dimensions of the slit aperture ratio are not particularly limited, and can be adjusted according to specific design requirements and/or practical considerations.

Figure 5A:
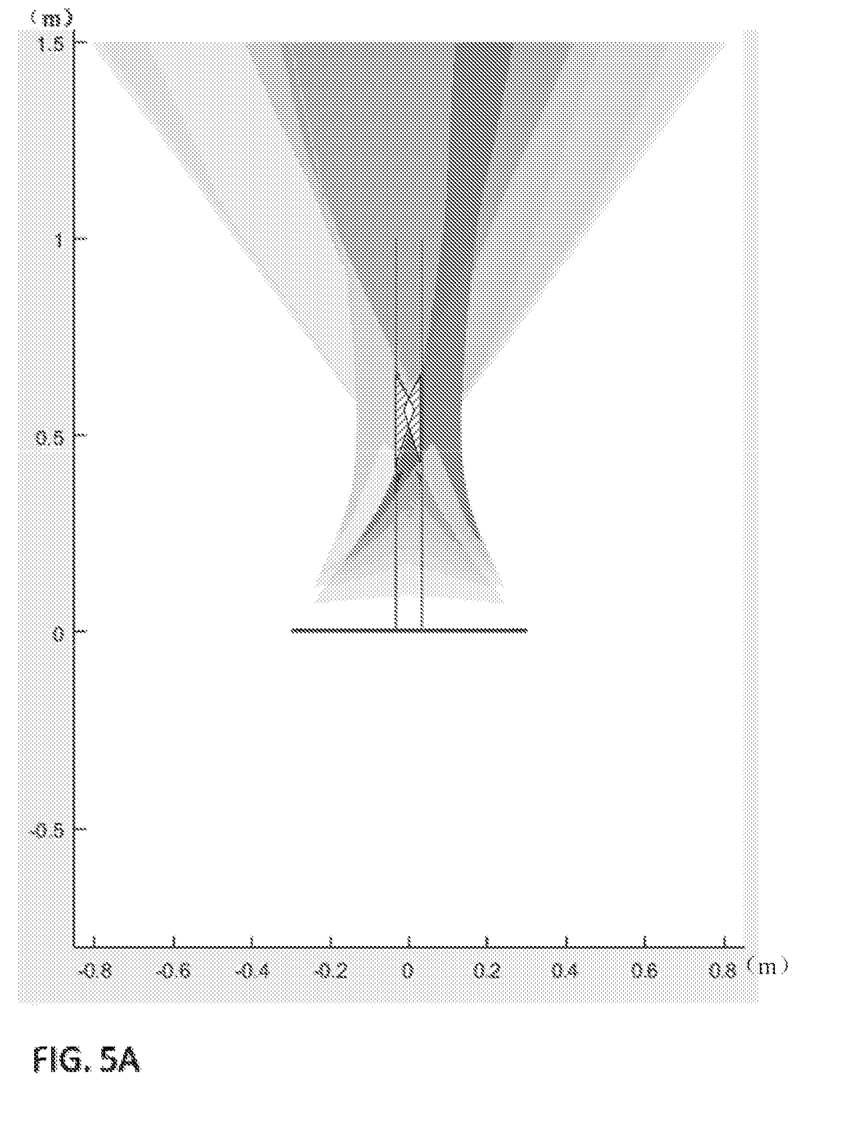
FIG. 5A shows simulated viewing zones produced by a 3D display apparatus using a slit grating according to the embodiment of the present disclosure illustrated in FIG. 3C.
Figure 5B:
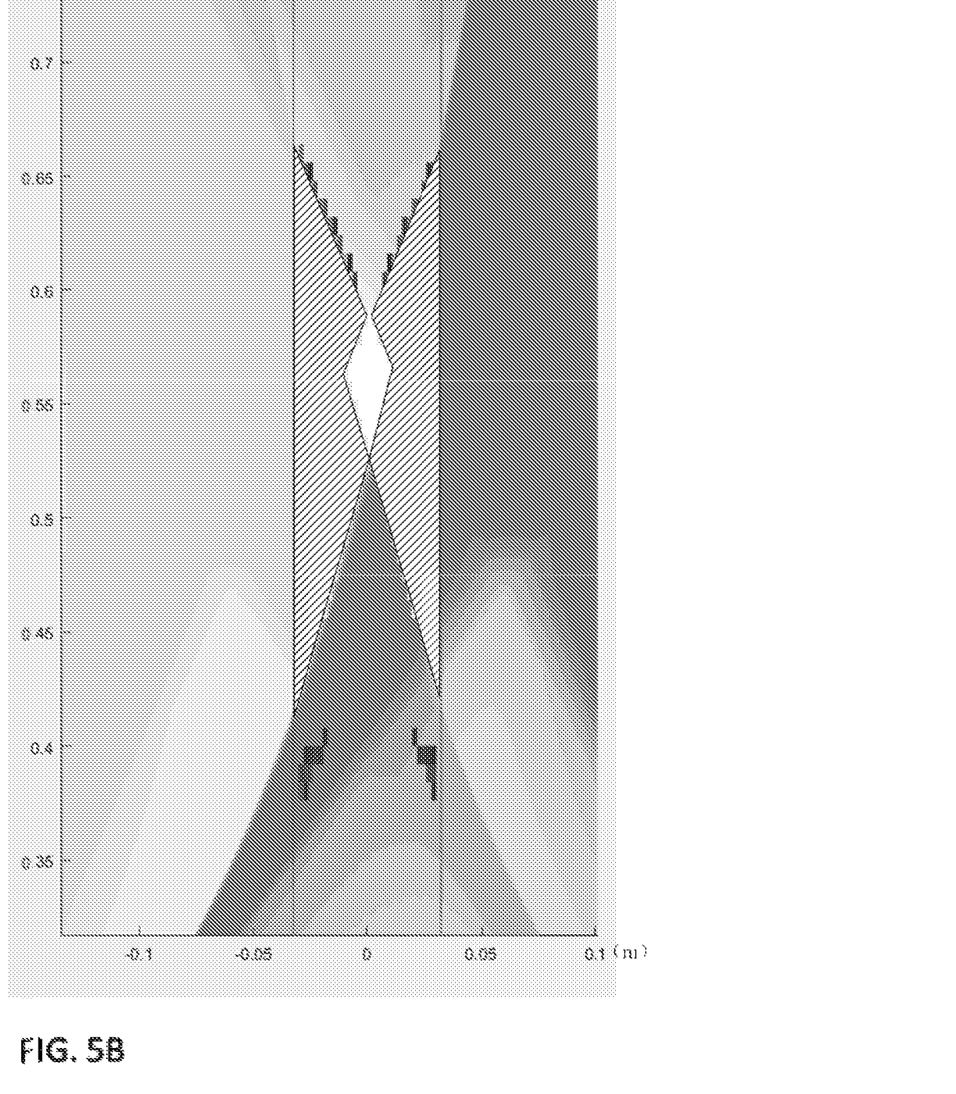
FIG. 5B is an enlarged view of FIG. 5A.

In FIG. 3C, as an illustrative example, the slit aperture ratio of each grating structure 11, 12, 13, 14, 15, 16 is the same. Specifically, each slit aperture ratio is 0.3. The widths of the grating structures on either side of the trend change point (i.e., the pair of grating structures 13, 14 having the widths of L3 and L4, respectively) decrease in a linear fashion, and specifically, in an increment of 0.996. When a slit grating configured in the manner shown in FIG. 3C is used in a 3D display apparatus, geometrical tracing of optical rays from the 3D display panel to normal viewing zones form diamond shapes, for example, as shown in FIGS. 5A and 5B. FIG. 5B is an enlarged view of FIG. 5A. In FIGS. 5A and 5B, areas shaded with diagonal lines correspond to viewing zones with minimal or no crosstalk. The x-axis represents distance in a direction parallel to the plane of the display panel, and the y-axis represents distance from the display panel to the slit grating (i.e., in a direction perpendicular to the plane of the display panel). A comparison of the viewing zone geometries shown in FIGS. 5B and 2B indicate that a slit grating according to the present disclosure significantly extends the length of the viewing zones in a direction perpendicular to the plane of the display panel. Further, as compared to FIG. 2B, the normal viewing zones in FIG. 5B converge toward each other in a direction parallel to the plane of the display panel. The point of convergence may face the general center of the display panel. The geometries of the viewing zones produced by a slit grating according to the present disclosure can enlarge the viewing areas or ranges within which a viewer can view a 3D display without interference from undesirable crosstalk, which in turn improves the viewing freedom of the viewer.

Figure 2C:
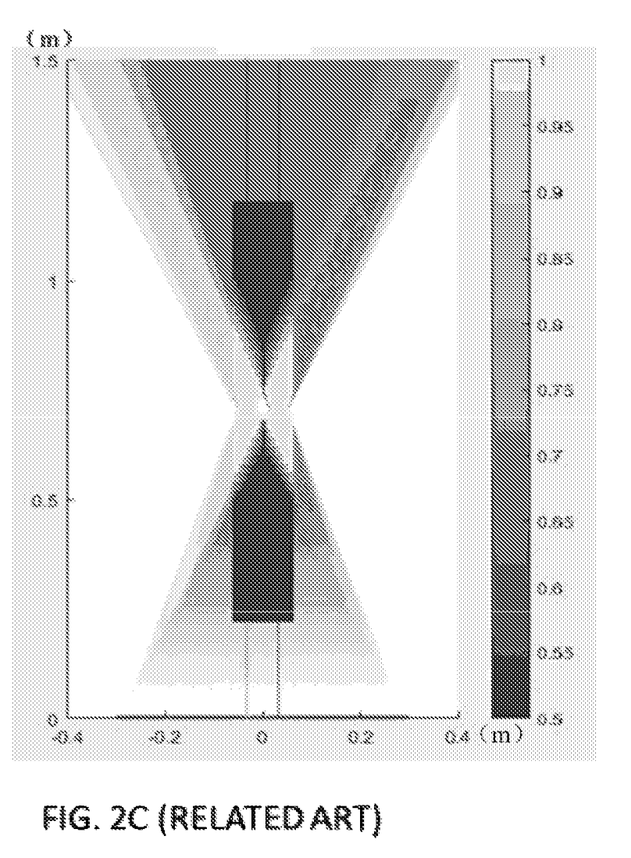
FIG. 2C shows simulated viewing zones produced by a 3D display apparatus using a conventional slit grating, following adjustments to parameters and position of the slit grating.
Figure 5C:
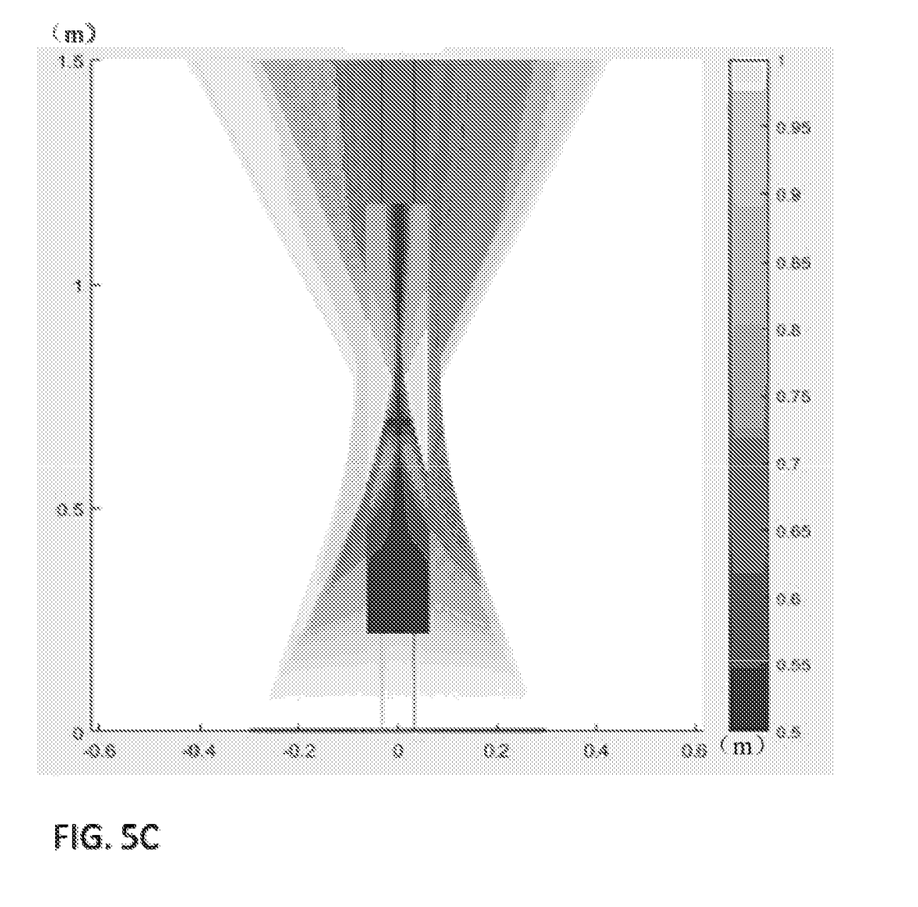
FIG. 5C shows simulated viewing zones produced by a 3D display apparatus using a slit grating according to the embodiment of the present disclosure illustrated in FIG. 3C, following adjustments to parameters and position of the slit grating.

To more clearly illustrate the improvements of a slit grating according to the present disclosure over a conventional slit grating, adjustments are made to certain parameters of both slit grating, and simulations are then performed to measure and evaluate the viewing zones produced by the slit grating in a 3D display apparatus. Specifically, adjustments are made to the overall shrinkage rate of the slit grating, and the distance between the slit grating and the 3D display panel (i.e., the position of the slit grating in the direction perpendicular to the plane of the display panel). FIGS. 2C and 5C show the simulation results for a conventional slit grating and a slit grating according to the present disclosure, respectively, following the adjustments. The grayscale bar on the right-hand side of FIGS. 2C and 5C shows the crosstalk intensity. A value of 1 on the grayscale bar indicates no crosstalk. Comparing FIG. 5C with FIG. 2C shows that a slit grating according to the present disclosure can significantly extend the normal viewing zones (i.e., viewing zones with minimal or no crosstalk) in a direction perpendicular to the plane of the display panel. Also as shown in FIG. 5C, the viewing zones converge toward each other in a direction parallel to the plane of the display panel. The point of convergence may face the general center of the display panel. The slit grating according to the present disclosure can therefore enlarge the viewing area and range of a 3D display apparatus, so as to provide a viewer with greater viewing freedom, for example, by extending the range of viewing distance within which the 3D display can be viewed with minimal or no crosstalk interferences. Further, as compared to the conventional slit grating shown in FIG. 2C, a slit grating according to the present disclosure produces remarkably larger viewing areas with low or no crosstalk, so as to greatly improve a viewer's viewing experience with the 3D displays.

An embodiment of the present disclosure also provides a 3D display apparatus. The 3D display apparatus may comprise a display panel and a slit grating according to the present disclosure disposed in front of the display panel. The implementation of the display device can be seen in the embodiments of the slit grating described above. The 3D display apparatus may be a mobile phone, a tablet computer, a television, a display, a notebook computer, a digital photo frame, a navigation device, and any other display products or components.

In a 3D display apparatus, a slit grating according to the present disclosure makes it possible to extend the viewing zones in a direction perpendicular to a plane of the 3D display panel. As compared to a conventional slit grating, an advantage of a slit grating according to the present disclosure is to enable the extension of the viewing range within which a viewer can view the 3D display effects on a 3D display panel without interference from crosstalk. A slit grating according to the present disclosure can allow a viewer greater freedom in adjusting their viewing positions (e.g., distance and/or angle) relative to the display panel without risking visual impairments to the 3D displays. The slit grating according to the present disclosure can these improve the quality of the viewer's 3D viewing experience.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A slit grating, comprising:
a plurality of grating structures arranged side by side, each grating structure comprising a light-blocking domain and a light-transmitting domain,
wherein along a direction in which the grating structures are arranged, widths of the grating structures successively increase and then decrease,
the slit grating comprises an even number of grating structures,
a pair of grating structures positioned at a midpoint of the slit grating forms a trend change point, the widths of the grating structures successively decrease in an outward direction away from the trend change point,
the light-blocking domain of each of the pair of grating structures abuts the light-blocking domain of the other of the pair of grating structures, and
the light-transmitting domain of each of the pair of grating structures abuts a light-transmitting domain of a grating structure on a side of the grating structure opposite from the other of the pair of grating structures.

2. The slit grating according to claim 1, wherein the light-blocking domains and the light-transmitting domains of the plurality of grating structures are arranged in an alternating manner.

3. The slit grating according to claim 1, wherein the widths of the grating structures successively decrease in a linear manner.

4. The slit grating according to claim 3, wherein the widths of the grating structures successively decrease in equal increments.

5. The slit grating according to claim 3, wherein a linear coefficient by which the widths of the grating structures successively decrease is at least 0.7 and less than 1.

6. The slit grating according to claim 5, wherein the linear coefficient is at least 0.99 and less than 1.

7. The slit grating according to claim 1, wherein the widths of the grating structures successively decrease in a non-linear manner.

8. The slit grating according to claim 1, wherein a slit aperture ratio of each of the plurality of grating structures is the same.

9. The slit grating according to claim 8, wherein the slit aperture ratio is in a range of from 0.2 to 0.6.

10. A three-dimensional display apparatus comprising a slit grating according to claim 1.

* * * * *